US011126353B2

United States Patent
Feng et al.

(10) Patent No.: US 11,126,353 B2
(45) Date of Patent: *Sep. 21, 2021

(54) METHOD AND APPARATUS FOR DATA COPY

(71) Applicant: EMC IP Holding Company LLC, Hopkinton, MA (US)

(72) Inventors: Changyu Feng, Beijing (CN); Jian Gao, Beijing (CN); Xinlei Xu, Beijing (CN); Lifeng Yang, Beijing (CN); Liam Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/704,748

(22) Filed: Dec. 5, 2019

(65) Prior Publication Data

US 2020/0110539 A1     Apr. 9, 2020

Related U.S. Application Data

(63) Continuation of application No. 15/848,532, filed on Dec. 20, 2017, now Pat. No. 10,545,668.

(30) Foreign Application Priority Data

Dec. 21, 2016   (CN) .......................... 201611193848.6

(51) Int. Cl.
*G06F 3/06*     (2006.01)
*G06F 12/02*   (2006.01)
(Continued)

(52) U.S. Cl.
CPC ............ *G06F 3/0607* (2013.01); *G06F 3/065* (2013.01); *G06F 3/0619* (2013.01);
(Continued)

(58) Field of Classification Search
CPC .... G06F 3/0607; G06F 3/0619; G06F 3/0679; G06F 3/065; G06F 12/0871;
(Continued)

(56) References Cited

U.S. PATENT DOCUMENTS 5,673,209 A   9/1997  Heiney et al.
6,101,585 A   8/2000  Brown et al.
(Continued)

OTHER PUBLICATIONS

C. Tsao, Y. Chang, M. Yang and P. Huang, "Efficient Victim Block Selection for Flash Storage Devices," in IEEE Transactions on Computers, vol. 64, No. 12, pp. 3444-3460, Dec. 1, 2015. (Year: 2015).*

*Primary Examiner* — Khoa D Doan
(74) *Attorney, Agent, or Firm* — BainwoodHuang

(57) ABSTRACT

Embodiments of the present disclosure relate to methods and apparatuses for data copy. A method comprises receiving, from a client module in a first processing unit, a read request for reading data from a first storage region. The method further comprises, in response to determining from the read request that the data is to be copied, obtaining, from a cache, a first bitmap associated with the first storage region, the first bitmap indicating if the first storage region is filled with zero. The method further comprises, in response to determining from the first bitmap that the first storage region is filled with zero, sending, to the client module, an indication that the data is zero.

20 Claims, 8 Drawing Sheets

(51) Int. Cl.
*G06F 12/0868* (2016.01)
*G06F 12/0871* (2016.01)

(52) U.S. Cl.
CPC ........ *G06F 3/0679* (2013.01); *G06F 12/0238* (2013.01); *G06F 12/0868* (2013.01); *G06F 12/0871* (2013.01); *G06F 2212/1024* (2013.01); *G06F 2212/263* (2013.01); *G06F 2212/284* (2013.01); *G06F 2212/312* (2013.01)

(58) Field of Classification Search
CPC .. G06F 12/0238; G06F 12/0868; G06F 16/27; G06F 16/2237; G06F 16/214; G06F 16/2365; G06F 2212/263; G06F 2212/1024; G06F 2212/312; G06F 2212/284
See application file for complete search history.

(56) References Cited

U.S. PATENT DOCUMENTS

| | | |
|---|---|---|
| 6,480,969 B1 | 11/2002 | Hitz et al. |
| 7,424,637 B1 | 9/2008 | Schoenthal et al. |
| 7,685,462 B1 | 3/2010 | Leong et al. |
| 7,694,173 B1 | 4/2010 | Schoenthal et al. |
| 7,934,029 B2 | 4/2011 | Chaussade |
| 8,316,181 B2 | 11/2012 | Galloway et al. |
| 9,916,244 B1 | 3/2018 | Tolvanen et al. |
| 10,025,510 B1 | 7/2018 | Koli et al. |
| 10,037,157 B1 | 7/2018 | Koli et al. |
| 10,061,540 B1 | 8/2018 | Koli et al. |
| 10,089,012 B1 | 10/2018 | Chen et al. |
| 10,089,015 B1 | 10/2018 | Gao et al. |
| 10,146,454 B1 | 12/2018 | Koli et al. |
| 10,545,668 B2 | 1/2020 | Feng et al. |
| 2004/0221102 A1 | 11/2004 | Watanabe |
| 2010/0186014 A1 | 7/2010 | Vaghani et al. |
| 2010/0257331 A1 | 10/2010 | Frank |
| 2012/0109897 A1 | 5/2012 | Janakiraman et al. |
| 2015/0199290 A1 | 7/2015 | Mathewson et al. |
| 2016/0217080 A1 | 7/2016 | Solihin |
| 2016/0358642 A1 | 12/2016 | Yang |
| 2017/0090815 A1 | 3/2017 | Kelner et al. |

\* cited by examiner

METHOD AND APPARATUS FOR DATA COPY

RELATED APPLICATIONS

This application claim priority from Chinese Patent Application Number CN201611193848.6, filed on Dec. 21, 2016 at the State Intellectual Property Office, China, titled "METHOD AND APPARATUS FOR DATA COPY" the contents of which is herein incorporated by reference in its entirety.

FIELD

Embodiments of the present disclosure generally relate to the field of data storage, and more specifically, to methods and apparatuses for data copy.

BACKGROUND

Data copy is a customary operation in a storage system. Generally, a data copy command is used to copy data of a given length from a source address to a destination address. Therefore, data copy can be completed by two operations, namely, a read operation and a writ operation following the read operation. The read operation is used to read the data of the given length from the source address, while the write operation is used to write the data of the given length into the destination address.

In traditional buffer-based data copy, for the read operation or write operation, a requester (for example, a client module in a processing unit) needs to pre-allocate a buffer. If there is a cache in the system, each of the read operation and the write operation requires data migration between the cache and the pre-allocated buffer. In more advanced data copy, such data migration can be avoided (namely, it is not necessary for the requester to pre-allocate a buffer). In response to the read request or the write request for data copy, the cache can prepare respective cache pages based on the source address or the destination address and return a list including addresses of the respective cache pages (called "scatter-gather list", SGL) to the requester so as to allow the requester to read/write the data from/to the cache directly.

SUMMARY

Embodiments of the present disclosure provide methods and apparatuses for data copy.

In a first aspect of the present disclosure, there is provided a method of data copy. The method comprises: receiving, from a client module in a first processing unit, a read request for reading data from a first storage region; in response to determining from the read request that the data is to be copied, obtaining, from a cache, a first bitmap associated with the first storage region, the first bitmap indicating if the first storage region is filled with zero; in response to determining from the first bitmap that the first storage region is filled with zero, sending, to the client module, an indication that the data is zero; and in response to receiving from the client module a write request for writing zero to a second storage region, updating, in the cache, a second bitmap associated with the second storage region to indicate that the second storage region is filled with zero.

In a second aspect of the present disclosure, there is provided a method of data copy. The method comprises: in response to receiving a command for copying data from a first storage region to a second storage region, sending, to a cache, a read request for reading the data from the first storage region, the read request indicating that the data is to be copied; and in response to receiving from the cache an indication that the data is zero, sending, to the cache, a write request for writing zero to the second storage region such that the cache updates a bitmap associated with the second storage region to indicate that the second storage region is filled with zero.

In a third aspect of the present disclosure, there is provided a cache device comprising a controller. The controller is configured to: receive, from a client module in a first processing unit, a read request for reading data from a first storage region; in response to determining from the read request that the data is to be copied, obtain a first bitmap associated with the first storage region, the first bitmap indicating if the first storage region is filled with zero; in response to determining from the first bitmap that the first storage region is filled with zero, send, to the client module, an indication that the data is zero; and in response to receiving from the client module a write request for writing zero to a second storage region, update a second bitmap associated with the second storage region to indicate that the second storage region is filled with zero.

In a fourth aspect of the present disclosure, there is provided a client component comprising a controller. The controller is configured to: in response to receiving a command for copying data from a first storage region to a second storage region, send, to a cache, a read request of reading the data from the first storage region, the read request indicating that the data is to be copied; and in response to receiving from the cache an indication that the data is zero, send, to the cache, a write request for writing zero to the second storage region such that the cache updates a bitmap associated with the second storage region to indicate that the second storage region is filled with zero.

In a fifth aspect of the present disclosure, there is provided a storage system which includes at least one processing unit. The at least one processing unit includes the cache described according to the third aspect of the present disclosure and the client component described according to the fourth aspect of the present disclosure.

In the sixth aspect of the present disclosure, there is provided a computer program product which is tangibly stored on a non-transient machine-readable medium and includes machine-executable instructions, the instructions, when executed, causing the device to implement any steps of the method according to the first aspect of the present disclosure.

In the seventh aspect of the present disclosure, there is provided a computer program product which is tangibly stored on a non-transient machine-readable medium and includes machine-executable instructions, the instructions, when executed, causing the device to implement any steps of the method according to the second aspect of the present disclosure.

This Summary is provided to introduce a selection of concepts in a simplified form that are further described below in the Detailed Description. This Summary is not intended to identify key features or essential features of the claimed present disclosure, nor is it intended to be used to limit the scope of the claimed present disclosure.

BRIEF DESCRIPTION OF THE DRAWINGS

The above and other objectives, features, and advantages of example embodiments of the present disclosure will become more apparent from the following detailed descrip

Throughout the drawings, the same or corresponding reference symbols are used to indicate the same or corresponding parts.

DETAILED DESCRIPTION OF EMBODIMENTS

Figure 1:
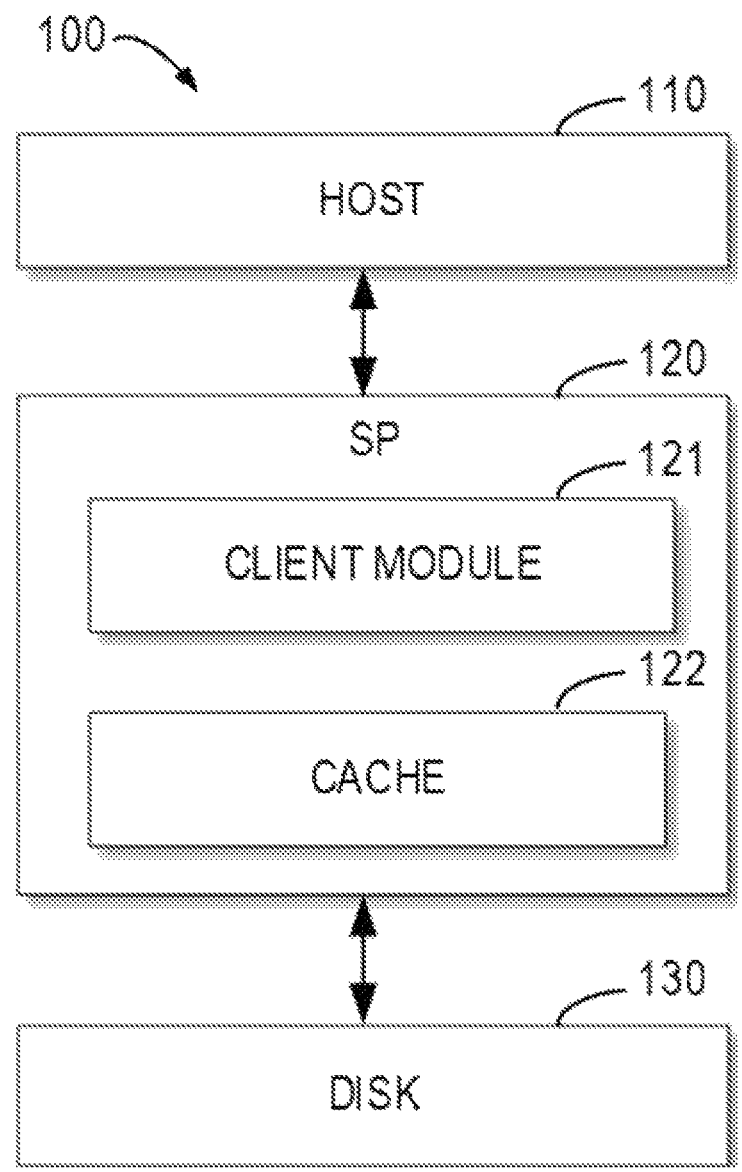
- FIG. 1 shows an architecture diagram of a storage system 100 in which data copy is performed.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment." Terms "a first", "a second" and others can denote different or identical objects. The following text may also contain other explicit or implicit definitions.

FIG. 1 shows an architecture diagram of a storage system 100 in which data copy is performed. As shown in FIG. 1, the storage system 100 includes a host 110, a storage processor (SP) 120 and a disk 130. It is to be understood that the structure and function of the storage system 100 are described only for the purpose of illustration, without suggesting any limitations to the scope of the present disclosure. As will be described in further detail in the following text, embodiments of the present disclosure can be applied to storage systems with different structures and/or functions.

The host 110 can be any of a physical computer, a virtual machine, a server and so on which operates a user application. The host 110 can send an IO command, for example, a command for data copy, to SP120. The disk 130 can be any storage media currently known or to be developed in the future, such as a magnetic disk, a solid state disk (SSD) or a disk array.

SP 120 may include a client module 121 and a cache 122. The client module 121 may be configured to receive the IO command from the host 110, process the IO command and return an IO acknowledgement to the host 110. In the following depiction, the client module 121 is also called a "host-side module". The cache 122 may be configured to temporarily store data in a dynamic random access memory (DRAM), for example. The data may be subsequently written into the disk 130 at a proper time. It is to be understood that although only the client module 121 and the cache 122 are described here, SP 120 can also include other modules except for the above two modules, and the scope of the present disclosure is not limited in this respect.

When the client module 121 receives from the host 110 an IO command for copying data of a given length from a source address to a destination address, the client 121 can deliver a read request for reading the data from the source address and a write request for writing the address into the destination address to the cache 122 successively. The cache 122 can perform, in response to the read request and the write request, respective operations to migrate the data from a source cache page to a destination cache page. Then, the cache 122 can update data to the storage disk 130 at the proper time.

Figure 2:
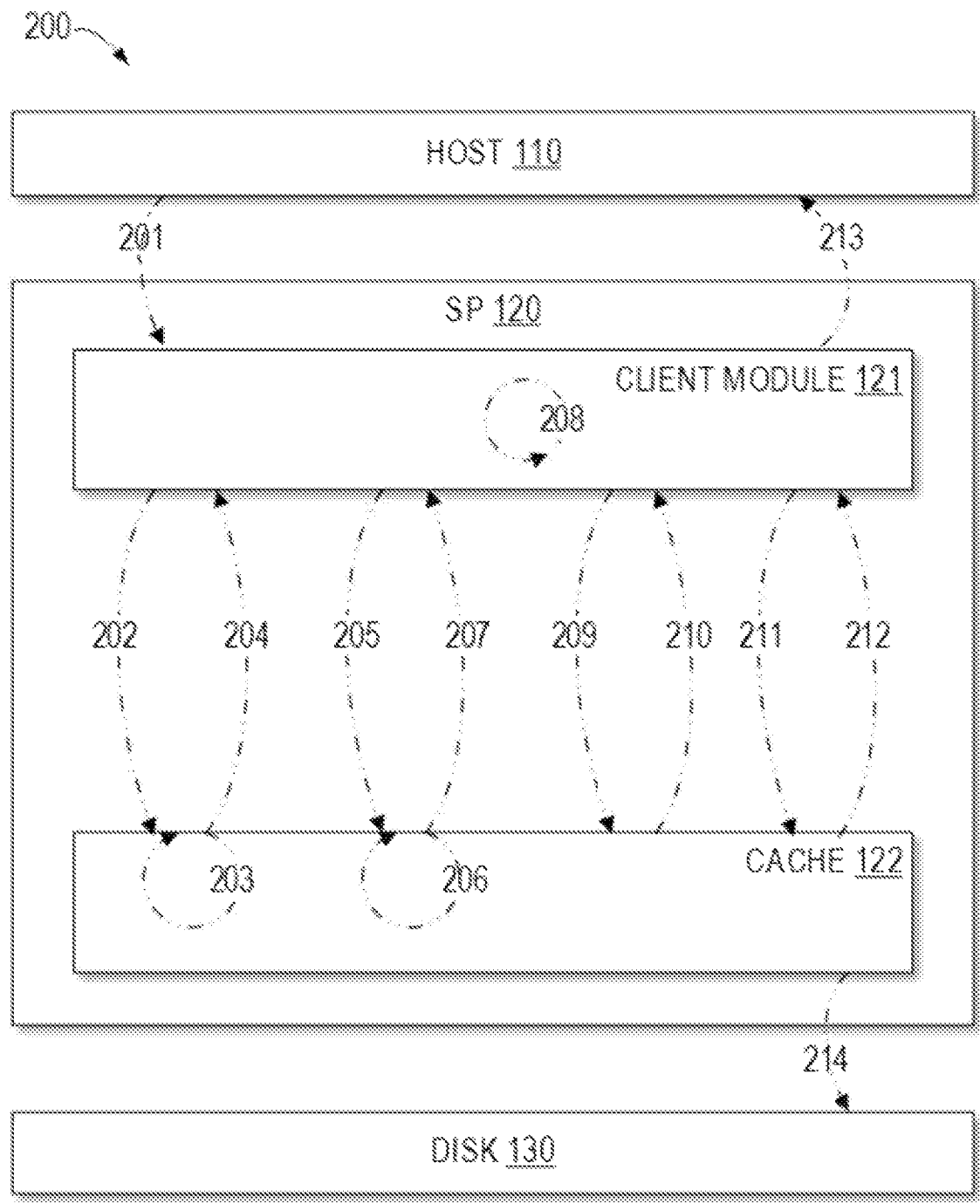
FIG. 2 shows a schematic flowchart for data copy in the storage system 100 based on a traditional solution.

FIG. 2 shows a schematic flowchart for data copy in the storage system 100 based on a traditional solution (such as the solution which requires no buffer). The dotted lines in FIG. 2 represent respective IO operations. The IO operations will be described in the following with reference to FIG. 1.

As shown in FIG. 2, the host 110 sends 201 a data copy command to the client module 121. The data copy command is used, for instance, to copy data from a source storage region determined by a source starting address and a length of the data to a destination storage region determined by a destination starting address and the length of the data. As used herein, the source and destination addresses each can be an address of a logic storage unit (for example, logic unit number (LUN)) managed by SP 120 and corresponding to the disk 130. Only for the purpose of illustration and simplification, in the following depiction, it is assumed that the source storage region is filled with zero.

The client module 121 sends 202 to the cache 122 a read request for reading the data from the source storage region. Correspondingly, the cache 122 prepares 203, in response to the read request, a source cache page for the read operation and writes, in response to the source storage region being filled with zero, zero into the source cache page. The cache 122 returns 204 a SGL including the source cache page to the client module 121.

The client module 121 sends 205, to the cache 122, a write request for writing data into the destination storage region. Correspondingly, in response to the write request, the cache 122 prepares 206 a destination cache page for the write operation. Cache 122 returns 207 a SGL including the destination cache page to the client module 121.

The client module 121 performs data copy 208 with the two obtained SGLs such that the data is migrated from the source cache page to the destination cache page. Subsequently, the client module 121 sends 209 to the cache 122 an indication that the read operation is completed. Correspondingly, cache 122 returns 210, to the client module 121, an acknowledgement that the read request is completed. Similarly, the client module 121 sends 211, to the cache 122, an indication that the write operation is completed. Correspondingly, the cache 122 returns 212, to the client module 121, an acknowledgement that the write request is completed.

The client 121 sends 213 an indication that data copy is completed to the host 110. Subsequently, at a proper time, for example, cache 122 updates 214 the data to the disk 130.

It can be seen that, even if in more advanced data copy without a buffer, the cache may return the page to be used for the read operation to the requester (that is, the client module 121) in response to the read request, and return the page to be used for the write operation to the requester in response to the write request. The requester needs to utilize the above pages for data copy such that the data is migrated from the source cache page to the destination cache page.

However, when the source storage region is filled with zero (that is, the data to be copied is zero), many of the above input and output (IO) operations are unnecessary. For example, in this event, the client module 121 may not need to obtain the source cache page, since the source cache page filled with zero is only used to indicate to the subsequent write operation that the data to be written is zero. While data copy is performed in a complicated storage system with more SPs, the above unnecessary IO operations will significantly impact the system performance.

To solve the above problems and one or more of other potential problems, example embodiments of the present disclosure provide a scheme for data copy. The scheme employs a zero bitmap in the cache to deal with the situation that the source storage region is filled with zero, which enables a large amount of IO operations to be omitted compared with the traditional scheme (no matter whether it is the scheme with a buffer or the scheme without a buffer), thereby improving system performance effectively.

Figure 3:
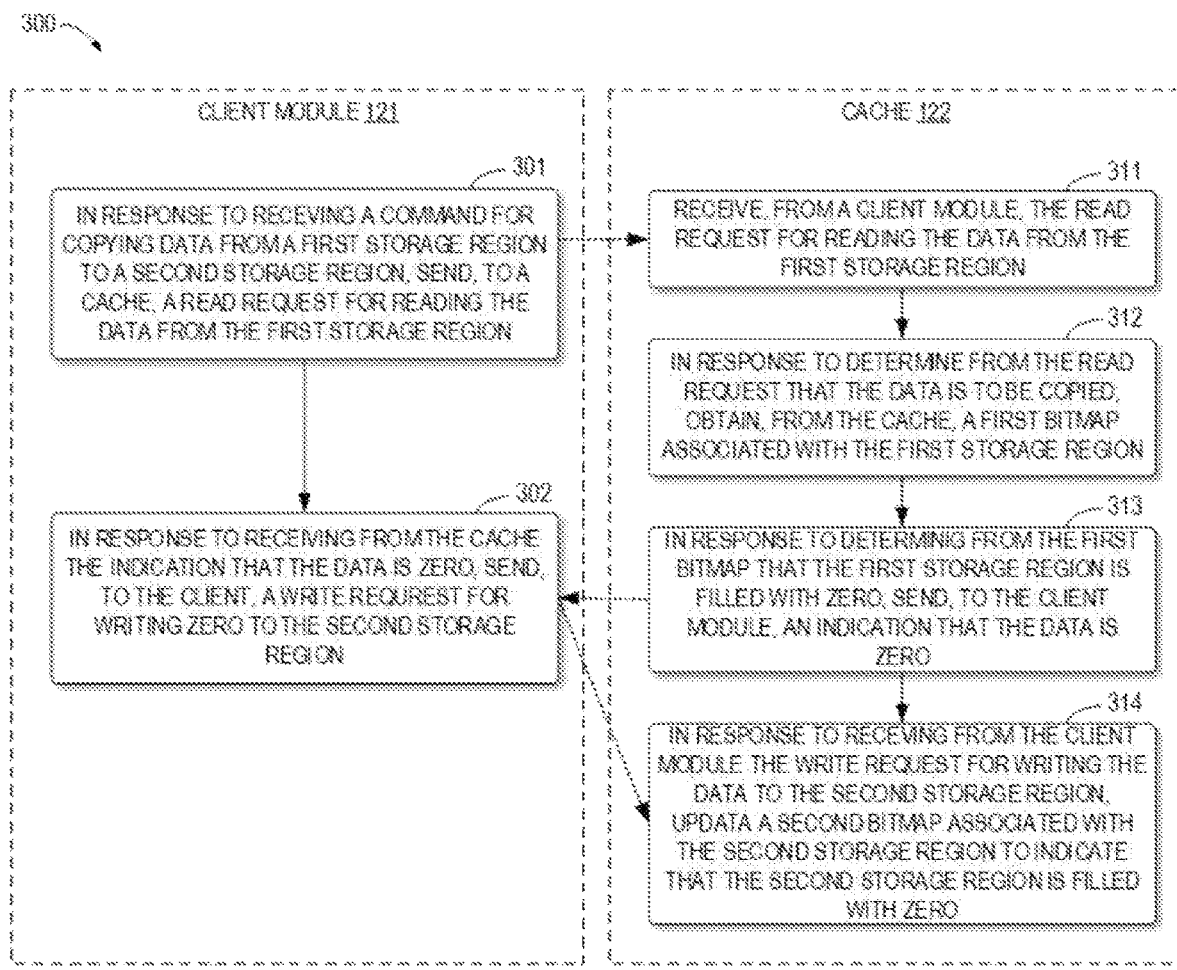
FIG. 3 shows a flowchart of a method 300 for data copy according to the embodiments of the present disclosure.

FIG. 3 is a flowchart of a method 300 for data copy according to the embodiments of the present disclosure. The acts involved in method 300 will be described with reference to FIG. 1 in the following. For the ease of discussion, two modules are involved in the depiction of method 300, namely, the client module 121 and the cache 122. In FIG. 3, for example, acts on the left side are executed by the client module 121, while acts on the right side are executed by the cache 122. It should be appreciated that the method 300 may further include additional acts not shown and/or omit some acts as shown. The scope of the present disclosure is not limited in this aspect.

At block 301, in response to receiving a command for copying data from a first storage region to a second storage region, the client module 121 sends to the cache 122 a read request for reading the data from the first storage region. The read request may indicate that the data is to be copied. In some embodiments, for example, the client module 121 can set a flag to indicate that the data is to be copied and send the read request including the flag to the cache 122. The flag enables the cache 122 to distinguish whether the read request is an ordinary read request or a read request for data copy.

Correspondingly, at block 311, the cache 122 receives, from client 121, the read request for reading data from the first storage region. In some embodiments, the read request may include the flag indicating that the data is to be copied. In this event, the cache 122 may obtain the flag from the read request and determine if the data is to be copied based on the flag.

At block 312, in response to determining from the read request that the data is to be copied, the cache 122 obtains a first bitmap associated with the first storage region. In some embodiments, the cache 122 may maintain a respective zero bitmap for each logic storage unit (for example, LUN), where each of bits in the respective zero bitmap can represent an address space of a given length (such as, one megabyte). When a value of a certain bit is 1, it may indicate that an address space of a given length corresponding to the bit is filled with zero (that is, all of the data in the address space is zero). As used herein, a first bitmap may refer to the zero bitmap associated with the first storage region. In other words, the first bitmap is used to indicate if the first storage region is filled with zero. Only for the purpose of illustration and simplification, in the following depiction, it is assumed that the first storage region is filled with zero. For example, the cache 122 can determine that the first storage region is filled with zero in response to a respective bit corresponding to the first storage region in the first bitmap being 1.

At block 313, in response to determining from the first bitmap that the first storage region is filled with zero, the cache 122 may send an indication to the client module 121 that the data is zero. In some embodiments, in order to be compatible with the traditional solution, the cache 122 may include the indication in a SGL for returning an address of a page to the client module 121, without performing the actual preparation of the page or writing zero to the page.

At block 302, in response to receiving from the cache 122 the indication (for example, the SGL containing the indication) that the data is zero, the client module 121 sends to the cache 122 a write request for writing zero to the second storage region.

At block 314, in response to receiving from the client module 121 the write request for writing zero to the second storage region, the cache 122 updates a second bitmap associated with the second storage region. As used herein, the second bitmap refers to a bitmap associated with the second storage region. In other words, the second bitmap may be used to indicate if the second storage region is filled with zero. In some embodiments, for example, the cache 122 may set a bit in the second bitmap corresponding to the second storage region to 1 so as to indicate that the second storage region is filled with zero.

Compared with the traditional solution as shown in FIG. 2, it can be seen that for the case that the source storage region is filled with zero, it is unnecessary to prepare a source cache page for the read operation or a destination cache page for the write operation in some embodiments of the present disclosure. Therefore, there will no need for data migration from the source cache page to the destination cache page. Rather, embodiments of the present disclosure can complete copy for the data that is zero only by modifying respective bitmaps, thereby reducing the number of IO operations significantly and improving system performance effectively.

Figure 4:
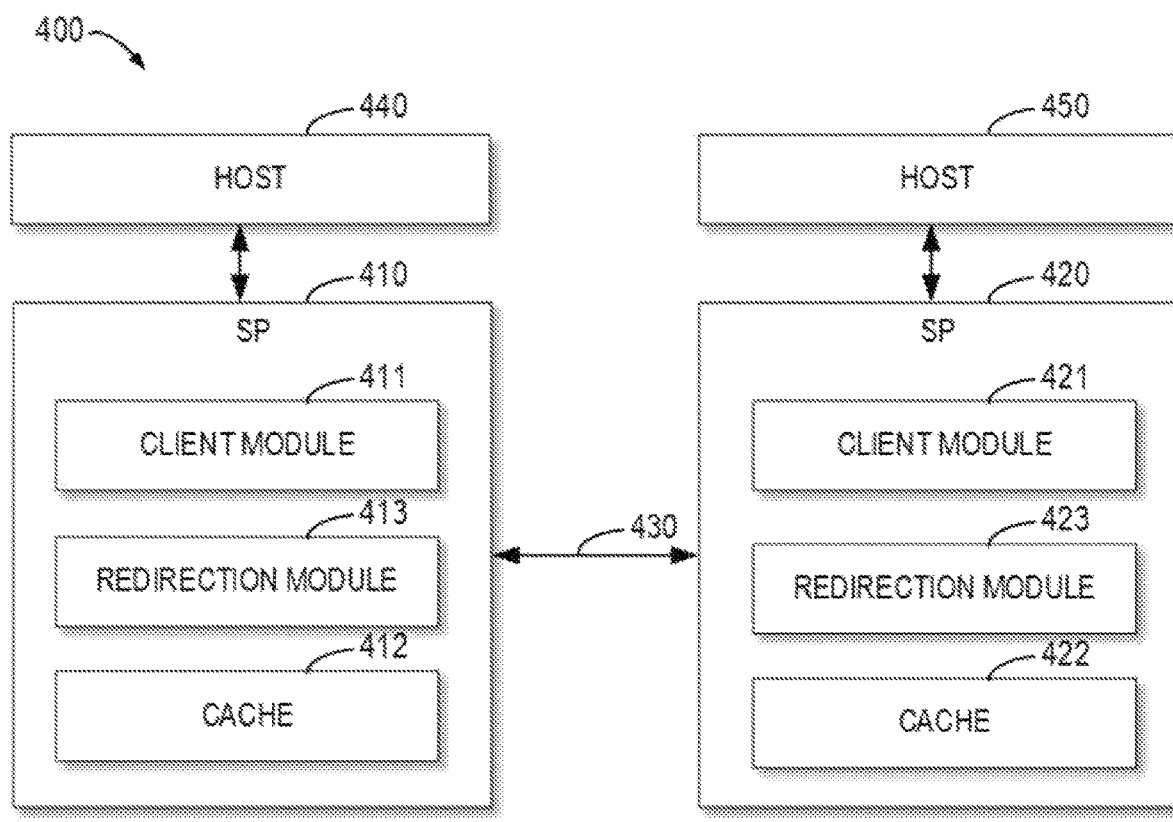
FIG. 4 shows an architecture diagram of a storage system 400 in which data copy is performed.

As mentioned above, embodiments of the present disclosure can also be applied to a complicated storage system with more SPs. FIG. 4 is an architecture diagram of a storage system 400 in which data copy is performed. As shown in FIG. 4, there are two SPs sharing a disk (not shown in FIG. 4) in the storage system 400, namely, SP 410 and SP 420. The two SPs can interact via a communication management interface (CMI) 430. Furthermore, there are a host 440 and a host 450 in the storage system 440. For example, the host 440 may send a data copy command to SP 410, and the host 450 may send a data copy command to SP 420. For the purpose of illustration, only two SPs and two hosts are shown in FIG. 4. However, it is to be understood that the embodiments of the present disclosure can also be applied to a storage system with more SPs and hosts.

SP 410 is taken as an example in the following. Similar to SP 120 as shown in FIG. 1, SP 410 may include a client module 411 and a cache 412. The client module 411 may be configured to receive an IO command from the host 440, process the IO command and return an IO acknowledgement to the host 440. The cache 412 may be configured to temporarily store data in a dynamic random access memory (DRAM), for example. The data may be subsequently written into the disk at a proper time.

Furthermore, SP 410 may include a redirection module 413. For example, the storage system 400 can provide logic storage units (such as LUNs) corresponding to the disk to the host. These LUNs are unsymmetrical. In other words, each of the LUNs can be managed by a different SP. A mapping relation among these LUNs and the SPs can be recorded in the redirection module 413 which can re-direct an IO request to a corresponding SP based on the address associated with the IO request (for example, LUN address).

Although the above depiction is provided specifically for SP 410, it is to be understood that the above depiction also applies to SP 420 (for example, for the client module 421, the cache 422 and the redirection module 413).

In this event, depending on whether a LUN represented by the source address or the destination address in the data copy command belongs to SP410 or SP420, data copy to be performed in the storage system 400 may involve one of following four scenarios: 1) both the LUN represented by the source address (also called source LUN) and the LUN represented by the destination address (also called destination LUN) are managed by SP 410; 2) both the source LUN and destination LUN are managed by SP 420; 3) the source LUN is managed by SP 410 while the destination LUN is managed by SP 420; and 4) the source LUN is managed by SP 420 while the destination LUN is managed by SP 410.

Embodiments of the present disclosure can be applied to the above four scenarios to reduce the number of IO operations and improve system performance.

In some embodiments, for scenario 1), for example, when the host 440 initiates data copy to the client module 411, the data copy to be performed in the storage system 400 is similar to that performed in the storage system 100. In other words, the redirection module 413 does not perform the actual redirection operation. Data copy in the storage system 100 has been described in detail with reference to FIG. 3, which will not be repeated herein.

Figure 5:
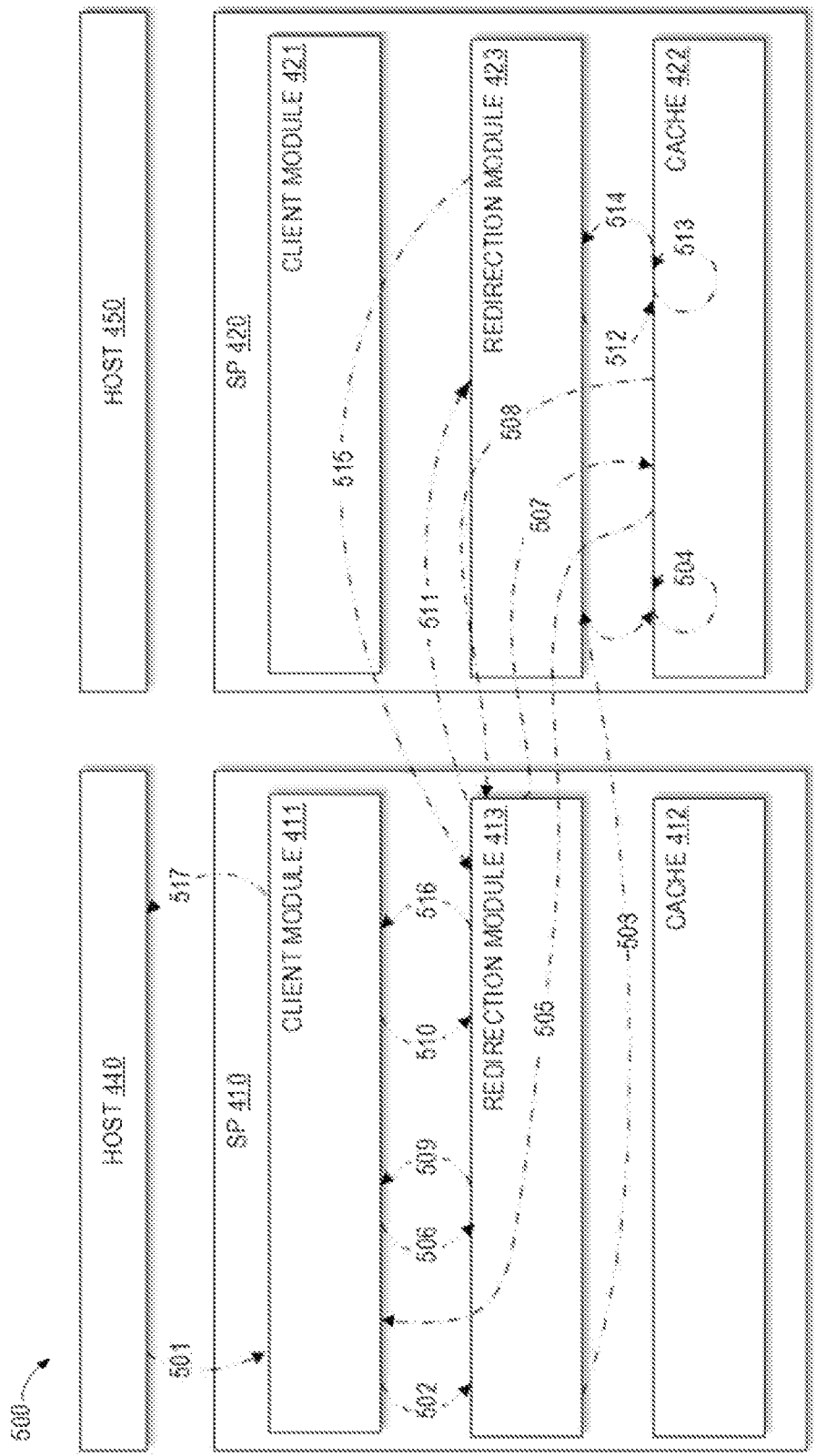
FIG. 5 shows a schematic flowchart for data copy in the storage system 400 according to the embodiments of the present disclosure.

In some embodiments, for scenario 2), for example, when the host 440 initiates data copy to the client module 411, IO requests associated with the reading and write operations initiated by the client module 411 to the cache can be re-directed by the redirection module 413 to the SP 420 and finally reache the cache 422. For example, FIG. 5 shows a schematic flowchart for data copy in the storage system 400 according to the embodiments of the present disclosure. The dotted lines as shown in FIG. 5 represent respective IO operations. It is to be understood that the IO operations as shown in FIG. 5 are only for the purpose of illustration. In practice, the actual order and/or number of IO operations can be different from that as shown in FIG. 5. The scope of the present disclosure is not limited in this aspect.

As shown in FIG. 5, the host 440 sends 501 a data copy command to the client module 411. For example, the data copy command is used to copy data from a source storage region determined by a source starting address and a length of the data to a destination storage region determined by a destination starting address and the length of the data. Only for the purpose of illustration and simplification, in the following depiction, it is assumed that the source storage region is filled with zero.

The client module 411 sends 502 to the redirection module 413 a read request for reading data from the source storage region. In response to determining that a LUN to which the source storage region belongs is managed by SP 420, the redirection module 413 re-directs 503 the read request to a redirection module 423. The read request finally arrives at the cache 422 via the redirection module 423.

The cache 422 obtains 504 a zero bitmap associated with the source storage region to determine if the source storage region is filled with zero. In response to determining that the source storage region is filled with zero, the cache 422 may send 505 to the redirection module 423 an indication (for example, a SGL containing the indication that the data is zero) that the data to be copied is zero. The indication may reach the client module 411 finally via the redirection module 413.

The client module 411 may send 506, to the redirection module 413, an indication that the read operation is completed. The indication can reach 507 the cache 422 via the redirection module 413 and the redirection module 423. The cache 422 may return 508 an acknowledgement that the read request is completed and the acknowledgement arrives 509 at the client module 411 via the redirection module 423 and the redirection module 413.

The client module 411 can send 510 to the redirection module 413 a write request for writing zero to the destination storage region. Correspondingly, in response to determining that a LUN to which the destination storage region belongs is managed by SP 420, the redirection module 413 may re-direct 511 the write request to the redirection module 423. The write request finally arrives 512 at the cache 422. Correspondingly, the cache 422 updates 513 a bitmap associated with the destination storage region to indicate that the destination storage region is filled with zero.

The cache 422 may return 514 an acknowledgement that the read request is completed. The acknowledgement may be re-directed 515 to the redirection module 413 via the redirection module 423 and arrive 516 at the client module 411 via the redirection module 413. Correspondingly, the client module 411 can send 517 an indication to the host 440 that the data copy is completed.

Figure 6:
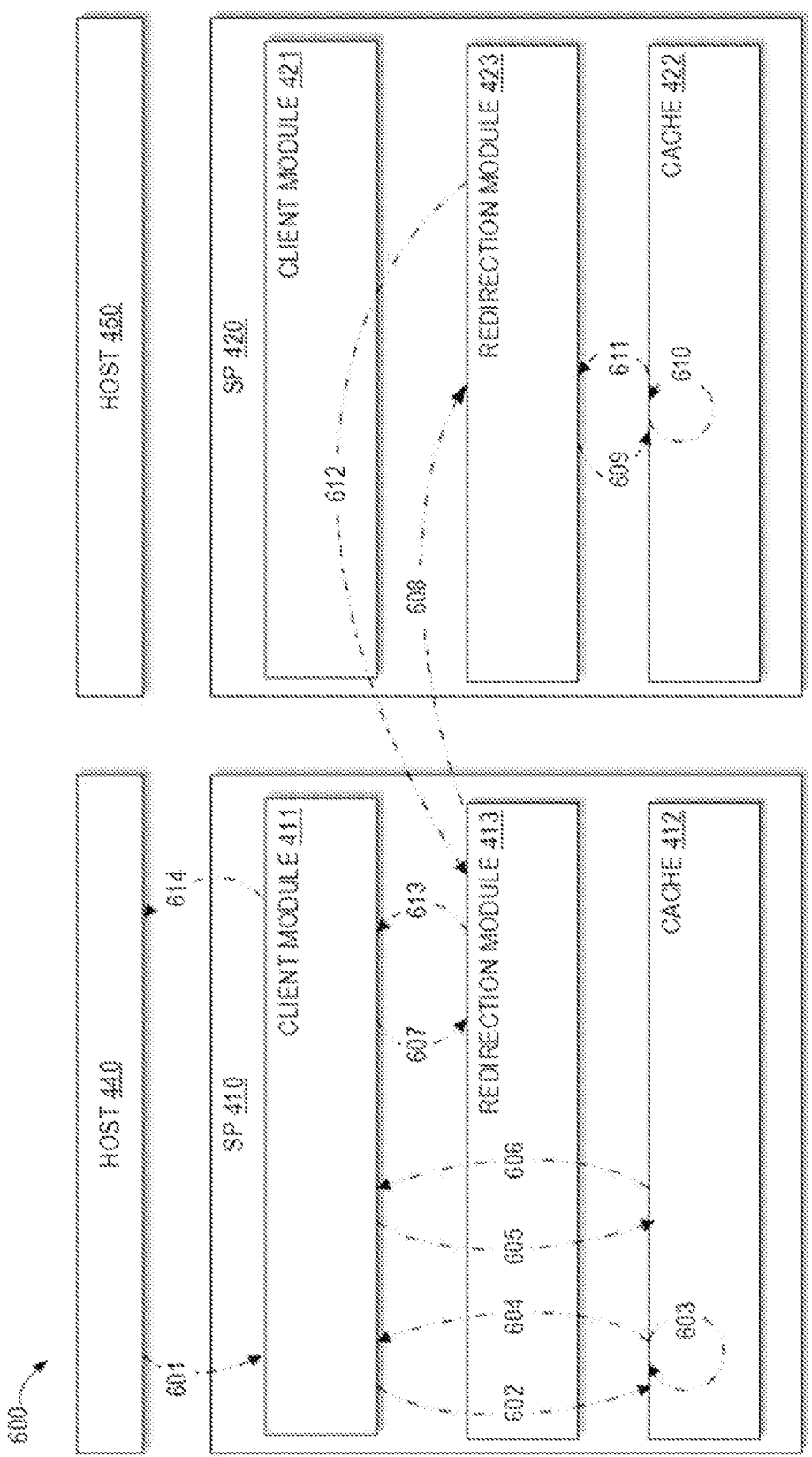
FIG. 6 shows a schematic flowchart for data copy in the storage system 400 according to the embodiments of the present disclosure.

In some embodiments, for scenario 3), for example, when the host 440 initiates data copy to the client module 411, IO requests associated with the write operation initiated by the client module 411 to the cache can be re-directed to SP 420 by the redirection module 413 and finally arrive at the cache 422. For example, FIG. 6 shows a schematic flowchart for data copy in the storage system 400 according to the embodiments of the present disclosure. The dotted lines as shown in FIG. 6 represent respective IO operations. It is to be understood that the IO operations as shown in FIG. 6 are only for the purpose of illustration. In practice, the actual order and/or number of IO operations can be different from that as shown in FIG. 6. The scope of the present disclosure is not limited in this aspect.

As shown in FIG. 6, the host 440 sends 601 a data copy command to the client module 411. For example, the data copy command is used to copy data from a source storage region determined by a source starting address and a length of the data to a destination storage region determined by a destination starting address and the length of the data. Only for the purpose of illustration and simplification, in the following depiction, it is assumed that the source storage region is filled with zero.

The client module 411 sends 602 to the cache 412 a read request for reading the data from the source storage region (since a LUN to which the source storage region belongs is managed by SP 410, the redirection module 413 does not perform an actual redirection operation).

The cache 412 obtains 603 a zero bitmap associated with the source storage region to determine if the source storage region is filled with zero. In response to determining that the source storage region is filled with zero, the cache 412 may send 604 to the client module 411 an indication (for example, a SGL containing the indication that the data is zero) that the data to be copied is zero.

The client module 411 may send 605, to the cache 412, an indication that the read operation is completed. Correspondingly, the cache 412 may return 606 an acknowledgement that the read request is completed.

The client module 411 may send 607 to the redirection module 413 a write request for writing zero to the destination storage region. Correspondingly, in response to determining that a LUN to which the destination storage region belongs is managed by SP 420, the redirection module 413 may re-direct 608 the write request to the redirection module 423. The write request finally arrives 609 at the cache 422. Correspondingly, the cache 422 may update 610 the zero bitmap associated with the destination storage region to indicate that the destination storage region is filled with zero.

The cache 422 may return 611 an acknowledgement that the write request is completed. The acknowledgement may be re-directed 612 to the redirection module 413 via the redirection module 423, and finally arrive 613 at the client module 411 via the redirection module 413. Correspondingly, the client module 411 may send 614 an indication that the data copy is completed to the host 440.

In some embodiments, for scenario 4), for example, when the host 440 initiates data copy to the client module 411, IO requests associated with the read operation initiated by the client module 411 to the cache can be re-directed by the redirection module 413 to the redirection module 423 in SP 420 and finally arrive at the cache 422. Based on the process for scenario 3) as described with reference to FIG. 6 in above, those skilled in the art can easily appreciate how to perform for scenario 4). Details will not be repeated herein.

It can be seen that, when embodiments of the present disclosure are applied to a complicated storage system with a plurality of SPs, the number of IO operations can be reduced significantly. Furthermore, there is no need for data exchange among the plurality of SPs (as shown in FIG. 5 and FIG. 6, only command exchange is performed between SP 410 and SP 420), thereby improving system performance effectively. Moreover, when the shared disk is a SSD, due to reduced frequency for writing data into the SSD (for example, it is only necessary to update the disk based on the zero bitmap at a proper time), the wearing degree of the SSD will be reduced significantly, thereby increasing the life cycle of the SSD.

Figure 7:
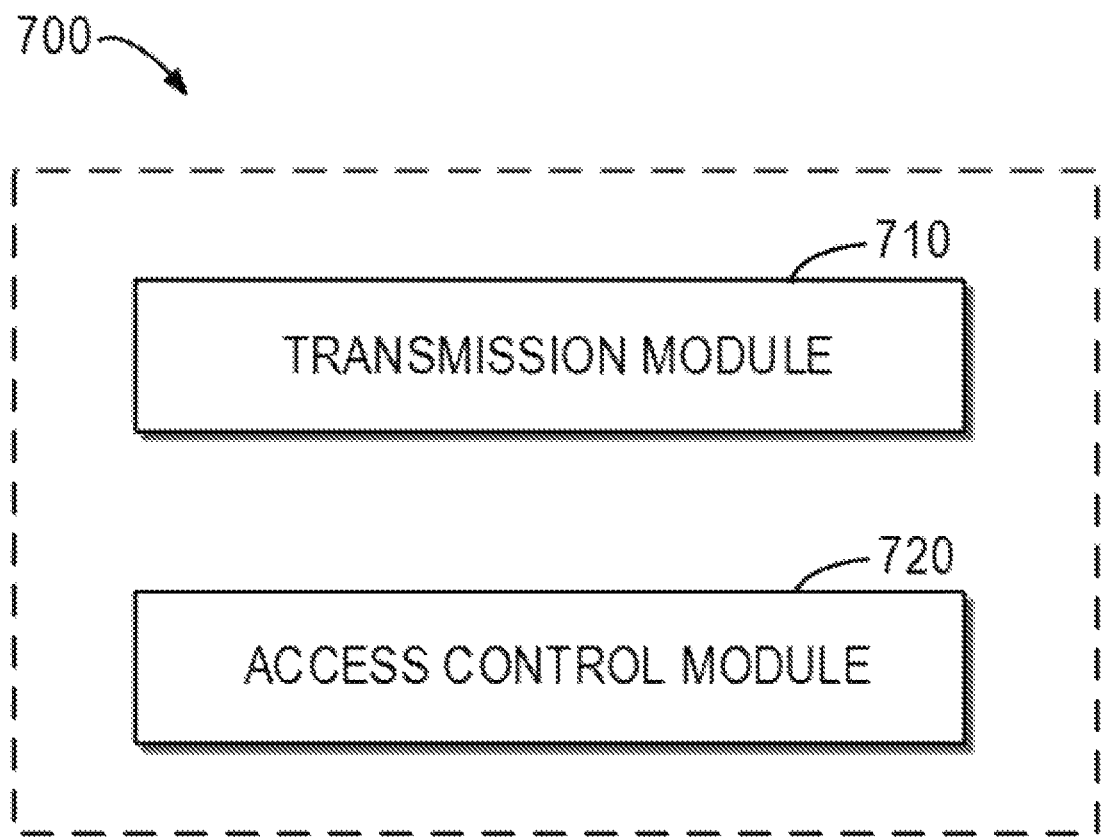
FIG. 7 shows a block diagram of an apparatus 700 for data copy according to the embodiments of the present disclosure.

FIG. 7 is a block diagram of an apparatus 700 for data copy according to the embodiments of the present disclosure. For example, the cache 122 as shown in FIG. 1 and the cache 412 and/or 422 as shown in FIG. 4 can be implemented by the apparatus 700. As shown in FIG. 7, the apparatus 700 may include a transmission unit 710 which is configured to receive, from a client module in a first processing unit, a read request for reading data from a first storage region. The apparatus 700 may further include an access control unit 720 which is configured to in response to determining from the read request that the data is to be copied, obtain a first bitmap associated with the first storage region, the first bitmap indicating if the first storage region is filled with zero. The transmission unit 710 may be further configured to, in response to determining from the first bitmap that the first storage region is filled with zero, send, to the client module, an indication that the data is zero.

Furthermore, the access control unit 720 may be further configured to, in response to receiving from the client module a write request for writing zero to a second storage region, update a second bitmap associated with the second storage region to indicate that the second storage region is filled with zero.

For the sake of clarity, some optional modules of apparatus 700 are not shown in FIG. 7. However, it is to be understood that various features as described with reference to FIGS. 1-6 are likewise applicable to the apparatus 700. Besides, respective modules of the apparatus 7000 may be hardware modules or software modules. For example, in some embodiments, the apparatus 700 may be partially or completely implemented by software and/or firmware, e.g., implemented as a computer program product embodied on a computer readable medium. Alternatively or additionally, the apparatus 700 may be partially or completely implemented based on hardware, for example, implemented as an integrated circuit (IC) chip or an application specific integrated circuit (ASIC), a system on chip (SOC), a field programmable gate array (FPGA) and so on. The scope of the present disclosure is not limited in this aspect.

Embodiments of the present disclosure also provide a client component which includes a controller. The controller is configured to: in response to receiving a command for copying data from a first storage region to a second storage region, send, to a cache, a read request of reading the data from the first storage region, the read request indicating that the data is to be copied; and in response to receiving from the cache an indication that the data is zero, send, to the cache, a write request for writing zero to the second storage region such that the cache updates a bitmap associated with the second storage region to indicate that the second storage region is filled with zero.

Figure 8:
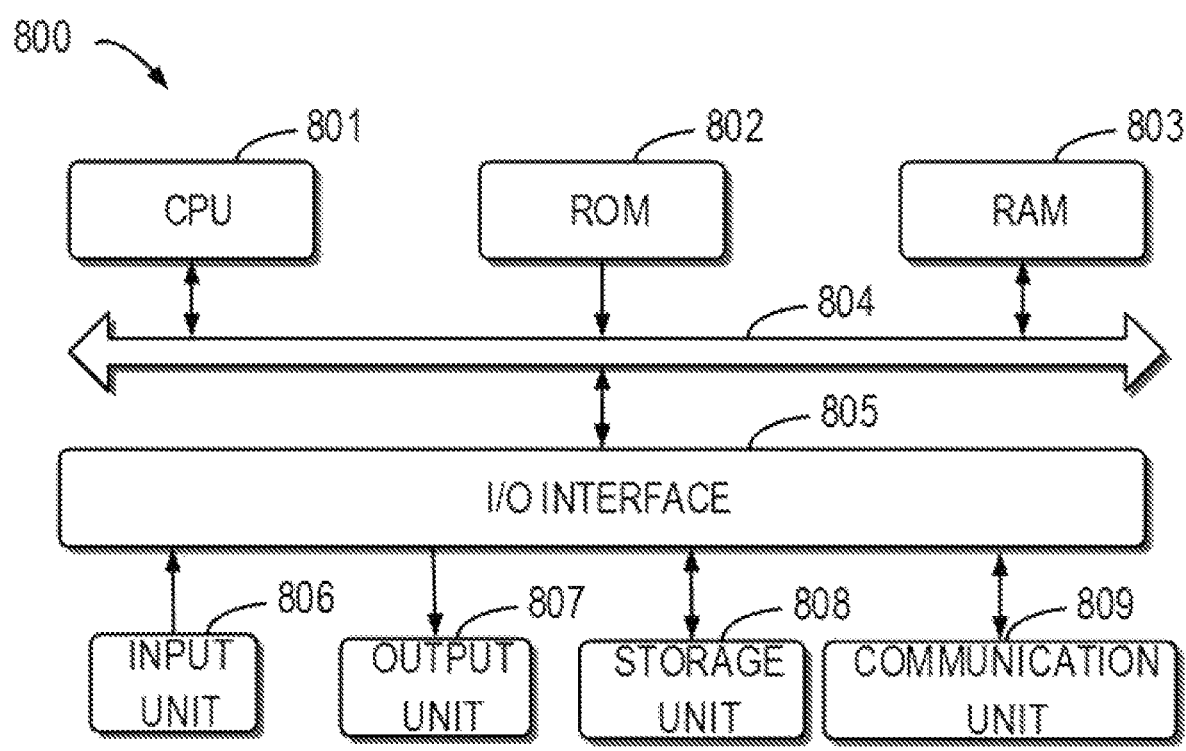
FIG. 8 illustrates a block diagram of an apparatus 800 adapted to implement the example embodiments of the present disclosure.

FIG. 8 is a schematic block diagram of an example apparatus 800 that can be used to implement the embodiments of the present disclosure. As shown in FIG. 8, the apparatus 800 includes a central processing unit (CPU) 801 which may perform various appropriate actions and processing based on computer program instructions stored in the read only memory (ROM) 802 or computer program instructions uploaded from storage unit 808 to the random access memory (RAM) 803. In the RAM 803, there further stores various programs and data needed by operation of the apparatus 800. The CPU 801, ROM 802 and RAM 803 are connected one another via a bus 804. The input/output (I/O) interface 805 is also connected to the bus 804.

The following components in the apparatus 800 are connected to the I/O interface 805: including: an input unit 806, such as a keyboard, a mouse, and the like; an output unit 807, such as display of various types and loudspeakers; a storage unit 808, such as magnetic disk and optical disk; a communication unit 809, such as network card, modem, wireless communication transceiver. The communication unit 809 allows the apparatus 800 to exchange data/information with other devices via computer networks, such as Internet and/or telecommunication networks.

The processes and processing described above, the method 300 for instance, can be executed by the processing unit 801. For example, in some implementations, the method 300 can be implemented as a computer software program which is corporeally contained in a machine readable medium, such as the storage unit 808. In some implementations, the computer program can be partially or wholly loaded and/or mounted on the apparatus 800 by the ROM 802 and/or the communication unit 809. When the computer program is uploaded to the RAM 803 and executed by the CPU 801, one or more steps of the method 300 described above can be executed.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method performed by a cache module of a data storage system for fulfilling a data copy request, the method comprising:
   receiving, from a client module operating on processing circuitry of the data storage system, a read request for reading data from a source storage region, the read request being part of a data copy operation initiated by the client module in response to the data copy request;
   looking up the first storage region in a first zero-fill bitmap of the cache module to determine whether the source storage region is entirely empty;
   in response to determining that the source storage region is entirely empty, sending a zero-fill indication to the client module indicating that the source storage region has been determined to be entirely empty;
   in response to sending the zero-fill indication to the client module, receiving a write request for filling a destination storage region with all zeroes; and
   in response to receiving the write request, updating a second zero-fill bitmap of the cache module to indicate that the destination storage region is entirely empty.

2. The method of claim 1 wherein:
   the read request includes a flag indicating that the data is to be copied; and
   the method further comprises determining from the read request that the data is to be copied by:
      obtaining the flag from the read request; and
      determining, based on the flag, if the data is to be copied.

3. The method of claim 1 wherein the cache module includes a plurality of zero-fill bitmaps, each zero-fill bitmap of the cache module representing a respective logical storage disk.

4. The method of claim 3 wherein:
   the source storage region is on a first logical storage disk, the first zero-fill bitmap representing the first logical storage disk;
   the destination storage region is on a second logical storage disk distinct from the first logical storage disk, the second zero-fill bitmap representing the second logical storage disk; and
   the first zero-fill bitmap is distinct from the second zero-fill bitmap.

5. The method of claim 3 wherein:
   the source storage region and the destination storage region are both on a single logical storage disk;
   the first zero-fill bitmap is the second zero-fill bitmap;
   the source storage region is represented by a first portion of the first zero-fill bitmap; and
   the destination storage region is represented by a second portion of the first zero-fill bitmap distinct from the first portion.

6. The method of claim 1 wherein sending the zero-fill indication to the client module includes refraining from preparing a buffer representing the source storage region in the cache module full of zeroes.

7. The method of claim 6 wherein sending the zero-fill indication to the client module further includes embedding the indication within a scatter-gather list that points to an address that does not include a prepared buffer full of zeroes.

8. The method of claim 1 wherein determining that the source storage region is entirely empty includes refraining from reading data from the source storage region.

9. The method of claim 1 wherein the method further comprises, after updating the second zero-fill bitmap, writing zeroes to a persistent storage disk of the data storage system based on the second zero-fill bitmap.

10. The method of claim 1 wherein the client module and the cache module are both implemented on a same storage processing unit of the data storage system.

11. The method of claim 1 wherein:
    the client module is implemented on a first storage processing unit of the data storage system;
    the cache module is implemented on a second storage processing unit of the data storage system distinct from the first storage processing unit; and
    the first storage processing unit is communicatively coupled to the second storage processing unit via a communication management interface.

12. An apparatus comprising:
    persistent storage; and
    processing circuitry coupled to memory configured to operate as a client module and a cache module, the cache module being configured to fulfill a data copy request by:
       receiving, from the client module, a read request for reading data from a source storage region, the read request being part of a data copy operation initiated by the client module in response to the data copy request;
       looking up the first storage region in a first zero-fill bitmap of the cache module to determine whether the source storage region is entirely empty;
       in response to determining that the source storage region is entirely empty, sending a zero-fill indication to the client module indicating that the source storage region has been determined to be entirely empty;
       in response to sending the zero-fill indication to the client module, receiving a write request for filling a destination storage region with all zeroes; and
       in response to receiving the write request, updating a second zero-fill bitmap of the cache module to indicate that the destination storage region is entirely empty.

13. The apparatus of claim 12 wherein:
    the read request includes a flag indicating that the data is to be copied; and
    the cache module is further configured to fulfill the data copy request by determining from the read request that the data is to be copied by:
       obtaining the flag from the read request; and
       determining, based on the flag, if the data is to be copied.

14. The apparatus of claim 12 wherein the cache module includes a plurality of zero-fill bitmaps, each zero-fill bitmap of the cache module representing a respective logical storage disk backed by the persistent storage.

15. The apparatus of claim 12 wherein sending the zero-fill indication to the client module includes refraining from preparing a buffer representing the source storage region in the cache module full of zeroes.

16. The apparatus of claim 12 wherein determining that the source storage region is entirely empty includes refraining from reading data from the source storage region.

17. The apparatus of claim 12 wherein the cache module is further configured to fulfill the data copy request by, after updating the second zero-fill bitmap, writing zeroes to the persistent storage based on the second zero-fill bitmap.

18. The apparatus of claim 12 wherein:
the apparatus further includes a plurality of storage processing units including a first storage processing unit and a second storage processing unit; and
the client module and the cache module are both implemented on the first storage processing unit of the data storage system.

19. The apparatus of claim 12 wherein:
the apparatus further includes a plurality of storage processing units including a first storage processing unit and a second storage processing unit distinct from the first storage processing unit; and
the client module is implemented on the first storage processing unit;
the cache module is implemented on the second storage processing unit; and
the first storage processing unit is communicatively coupled to the second storage processing unit via a communication management interface.

20. A computer program product comprising a non-transient computer-readable storage medium that tangibly stores a set of machine-executable instructions, which, when executed by a computing device, cause the computing device to operate a client module and a cache module, the cache module being configured to fulfill a data copy request by:
receiving, from the client module, a read request for reading data from a source storage region, the read request being part of a data copy operation initiated by the client module in response to the data copy request;
looking up the first storage region in a first zero-fill bitmap of the cache module to determine whether the source storage region is entirely empty;
in response to determining that the source storage region is entirely empty, sending a zero-fill indication to the client module indicating that the source storage region has been determined to be entirely empty;
in response to sending the zero-fill indication to the client module, receiving a write request for filling a destination storage region with all zeroes; and
in response to receiving the write request, updating a second zero-fill bitmap of the cache module to indicate that the destination storage region is entirely empty.

* * * * *